US011755297B2

(12) United States Patent
Thoemmes

(10) Patent No.: US 11,755,297 B2
(45) Date of Patent: *Sep. 12, 2023

(54) COMPILING MONOGLOT FUNCTION COMPOSITIONS INTO A SINGLE ENTITY

(71) Applicant: Red Hat, Inc., Raleigh, NC (US)

(72) Inventor: Markus Thoemmes, Grasbrunn (DE)

(73) Assignee: Red Hat, Inc., Raleigh, NC (US)

(*) Notice: Subject to any disclaimer, the term of this patent is extended or adjusted under 35 U.S.C. 154(b) by 0 days.

This patent is subject to a terminal disclaimer.

(21) Appl. No.: 17/831,281

(22) Filed: Jun. 2, 2022

(65) Prior Publication Data

US 2022/0291907 A1 Sep. 15, 2022

Related U.S. Application Data

(63) Continuation of application No. 16/886,759, filed on May 28, 2020, now Pat. No. 11,366,648.

(51) Int. Cl.
*G06F 9/44* (2018.01)
*G06F 8/41* (2018.01)
*G06Q 10/0631* (2023.01)

(52) U.S. Cl.
CPC .............. *G06F 8/433* (2013.01); *G06F 8/427* (2013.01); *G06Q 10/0631* (2013.01)

(58) Field of Classification Search
CPC ............................................. G06F 8/40–4443

(Continued)

(56) References Cited

U.S. PATENT DOCUMENTS 7,140,019 B2 11/2006 May et al.
8,473,935 B2 6/2013 Grice
(Continued)

FOREIGN PATENT DOCUMENTS

WO        2020096639 A1   5/2020
WO   WO-2020096639 A1 *  5/2020  ............ G06F 11/301

OTHER PUBLICATIONS

Leitner et al., " A Mixed-Method Empirical Study of Function-as-a-Service Software Development in Industrial Practice," PeerJPreprints, Jun. 26, 2018, pp. 1-24, https://doi.org/10.7287/peerj.preprints.27005v1, 24 pages.

(Continued)

*Primary Examiner* — Francisco J Aponte
(74) *Attorney, Agent, or Firm* — Womble Bond Dickinson (US) LLP

(57) ABSTRACT

Systems and methods for compiling functions into a single entity are disclosed. An execution graph representing dependencies between a plurality of functions is analyzed to identify portions of the graph that include two or more of the plurality of functions used as a combined entity and have a single entry point. The plurality of functions corresponds to a decomposed application. The processing device combines the functions of each of the identified one or more portions of the graph into a composition. For each portion of the graph that includes two or more of the plurality of functions used as a combined entity and has multiple entry points, the processing device determines whether to combine each function providing a subsequent entry point to the portion into a composition with other functions of the portion based at least in part on a network latency and a scale efficiency of the application.

20 Claims, 12 Drawing Sheets

(58) Field of Classification Search
USPC .......................................................... 717/144
See application file for complete search history.

(56) References Cited

U.S. PATENT DOCUMENTS

| | | | |
|---|---|---|---|
| 10,025,566 B1 | 7/2018 | Ahmed et al. | |
| 10,169,016 B2 | 1/2019 | Gschwind et al. | |
| 10,175,951 B2 | 1/2019 | Stanfill et al. | |
| 10,437,637 B1 | 10/2019 | Koneru et al. | |
| 10,496,619 B2 | 12/2019 | Stanfill et al. | |
| 10,606,574 B2 | 3/2020 | Gschwind et al. | |
| 10,678,522 B1 | 6/2020 | Yerramreddy et al. | |
| 10,885,003 B2 | 1/2021 | Stanfill et al. | |
| 10,951,492 B2 | 3/2021 | Sen et al. | |
| 11,068,246 B2 | 7/2021 | Copeland et al. | |
| 11,099,820 B2 | 8/2021 | Punathil et al. | |
| 11,263,107 B2 * | 3/2022 | Nasu | G06F 8/24 |
| 11,385,940 B2 * | 7/2022 | Junior | H04L 67/10 |
| 2014/0109070 A1 | 4/2014 | Mahamuni et al. | |
| 2016/0062747 A1 | 3/2016 | Stanfill et al. | |
| 2016/0170725 A1 | 6/2016 | Holton et al. | |
| 2017/0351789 A1 | 12/2017 | Szpak et al. | |
| 2018/0225096 A1 | 8/2018 | Mishra et al. | |
| 2018/0314504 A1 | 11/2018 | Gschwind et al. | |
| 2019/0073228 A1 | 3/2019 | Stanfill et al. | |
| 2019/0108067 A1 | 4/2019 | Ishikawa et al. | |
| 2020/0226009 A1 | 7/2020 | Bachmutsky et al. | |
| 2020/0272444 A1 | 8/2020 | Nilsen | |
| 2020/0401386 A1 | 12/2020 | Punathil et al. | |
| 2021/0042098 A1 * | 2/2021 | Madisetti | G06F 8/4441 |
| 2021/0124822 A1 * | 4/2021 | Tiwary | G06F 21/53 |
| 2021/0133066 A1 | 5/2021 | He et al. | |
| 2021/0208941 A1 | 7/2021 | Fong et al. | |
| 2021/0248115 A1 | 8/2021 | Jones et al. | |
| 2021/0263779 A1 | 8/2021 | Babokin et al. | |

OTHER PUBLICATIONS

Liang Bao et al. "Performance Modeling and Workflow Scheduling of Microservice-Based Applications in Clouds"; IEEE Transactions on Parallel and Distributed Systems, vol. 30, No. 9, Sep. 2019.

Fritz Alder et al. "S-FaaS: Trustworthy and Accountable Function-as-a-Service using Intel SGX"; Session: Trusted Execution Environments—CCSW '19, Nov. 11, 2019, London, United Kingdom.

* cited by examiner ns297 B2

COMPILING MONOGLOT FUNCTION COMPOSITIONS INTO A SINGLE ENTITY

CROSS-REFERENCE TO RELATED APPLICATIONS

This application is a continuation of U.S. patent application Ser. No. 16/886,759, filed May 28, 2020, the contents of which is hereby incorporated in its entirety.

TECHNICAL FIELD

Aspects of the present disclosure relate to functions as a service (FaaS) systems, and more particularly, to combining functions for efficient resource usage.

BACKGROUND

Function-as-a-Service (FaaS), is an event-driven computing execution model that runs in stateless containers and allows developers to build, run, and manage application packages as functions without having to maintain their own infrastructure. FaaS provides a way to implement serverless computing, which abstracts infrastructure concerns such as provisioning and managing servers as well as resource allocation, from developers and shifts it to a platform (e.g., the Red Hat™ OpenShift™ platform). A function is a piece of software executing logic, and applications may be composed of many functions. There are architectural constraints needed to enable some of the benefits of serverless computing, such as time limits on the execution of a function, so a function needs to be able to start up and run quickly. Functions may start within milliseconds and process individual requests. If there are several simultaneous requests for a function, then the system will create as many copies of the function as needed to meet demand. When demand drops, the function automatically scales down.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Figure 1:
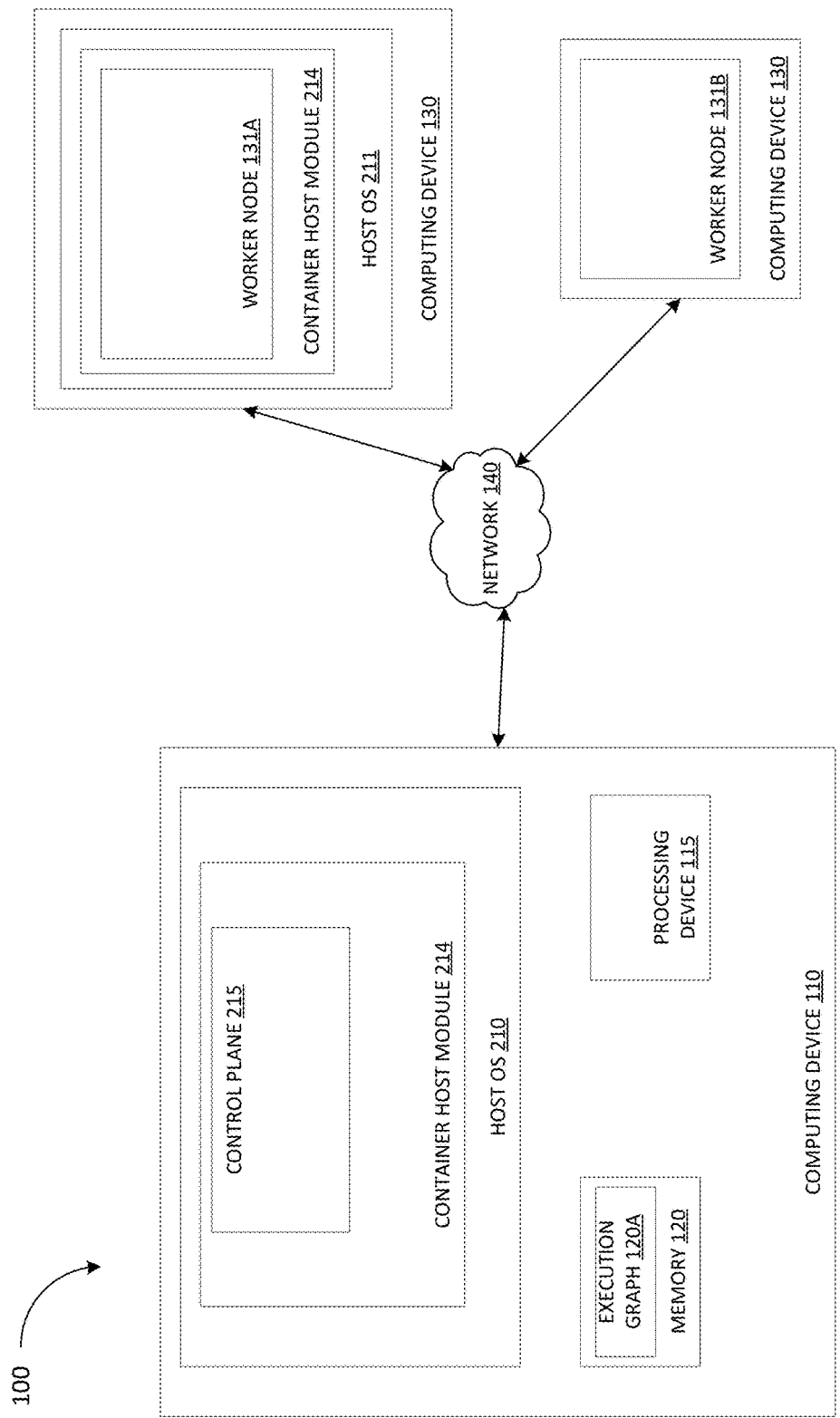
FIG. 1 is a block diagram that illustrates an example FaaS system, in accordance with some embodiments of the present disclosure.

In FaaS, developers attempt to decompose their application into small functions to make them individually scalable as much as possible. When an application is decomposed into a large number of functions (also referred to as microservices), each function may depend on a number of other functions. Thus, the resulting execution graph may increase in depth and breadth as well as complexity. Such architectures, while allowing for considerable scalability, introduce a considerable amount of network overhead, as each function call essentially becomes a separate network roundtrip. Indeed, the network latency that is introduced by the number of hops as an execution graph is traversed can be considerable.

Conversely, when an application is decomposed into a small number of functions, scale efficiency becomes an issue. Scale efficiency may refer to the ability to scale a function using the least amount of resources. When an application is decomposed into a small number of functions, it is more difficult to scale individual functions (e.g., only the functions that a user needs) without scaling the entire application, or large parts of the application (e.g., numerous other functions that the individual function is compiled into a composition with), which requires more resources.

The present disclosure addresses the above-noted and other deficiencies by using a processing device to analyze an execution graph representing dependencies between a plurality of functions that correspond to a decomposed application. The processing device may identify one or more portions of the graph that each include two or more of the plurality of functions used as a combined entity and have a single entry point. The functions within such portions of the graph are those that do not need to scale independently (e.g., scale efficiency will not be improved by implementing them separately). Thus, the processing device may compile the functions of each of the identified one or more portions of the graph into a composition. The processing device may then identify each portion of the graph that includes two or more of the plurality of functions used as a combined entity and has multiple entry points. The function(s) in these portions that provides the subsequent entry points are those that depend on functions from outside the portion. Because of this, leaving such a function separately implemented will require function calls from each function it depends on, which will increase network latency. However, compiling such a function into separate compositions with each function it depends on (especially in situations where one or more functions it depends on are already compiled into a composition with other functions) will lower the scale efficiency of the application since scaling an instance of that function will require scaling all the other functions in the composition that instance is a part of as well. Thus, the processing device may determine whether to compile each function providing a subsequent entry point to the portion into a composition with one or more other functions of the portion based at least in part on the benefit to network latency relative to the decrease in scale efficiency of the application.

FIG. 1 is a block diagram that illustrates an example FaaS system 100. As illustrated in FIG. 1, the FaaS system 100 includes a computing device 110, and a plurality of computing devices 130. The computing devices 110 and 130 may be coupled to each other (e.g., may be operatively coupled, communicatively coupled, may communicate data/messages with each other) via network 140. Network 140 may be a public network (e.g., the internet), a private network (e.g., a local area network (LAN) or wide area network (WAN)), or a combination thereof. In one embodiment, network 140 may include a wired or a wireless infrastructure, which may be provided by one or more wireless communications systems, such as a WiFi™ hotspot connected with the network 140 and/or a wireless carrier system that can be implemented using various data processing equipment, communication towers (e.g. cell towers), etc. In some embodiments, the network 140 may be an L3 network. The network 140 may carry communications (e.g., data, message, packets, frames, etc.) between computing device 110 and computing devices 130. Each computing device 110 and 130 may include hardware such as processing device 115 (e.g., processors, central processing units (CPUs)), memory 120 (e.g., random access memory 120 (e.g., RAM)), storage devices (e.g., hard-disk drive (HDD), solid-state drive (SSD), etc.), and other hardware devices (e.g., sound card, video card, etc.). In some embodiments, memory 120 may be a persistent storage that is capable of storing data. A persistent storage may be a local storage unit or a remote storage unit. Persistent storage may be a magnetic storage unit, optical storage unit, solid state storage unit, electronic storage units (main memory), or similar storage unit. Persistent storage may also be a monolithic/single device or a distributed set of devices. Memory 120 may be configured for long-term storage of data and may retain data between power on/off cycles of the computing device 110. Each computing device may comprise any suitable type of computing device or machine that has a programmable processor including, for example, server computers, desktop computers, laptop computers, tablet computers, smartphones, set-top boxes, etc. In some examples, each of the computing devices 110 and 130 may comprise a single machine or may include multiple interconnected machines (e.g., multiple servers configured in a cluster). The computing devices 110 and 130 may be implemented by a common entity/organization or may be implemented by different entities/organizations. For example, computing device 110 may be operated by a first company/corporation and one or more computing devices 130 may be operated by a second company/corporation. Each of computing device 110 and computing devices 130 may execute or include an operating system (OS) such as host OS 210 and host OS 211 respectively, as discussed in more detail below. The host OS of a computing device 110 and 130 may manage the execution of other components (e.g., software, applications, etc.) and/or may manage access to the hardware (e.g., processors, memory, storage devices etc.) of the computing device. In some embodiments, computing device 110 may implement a control plane (e.g., as part of a container orchestration engine) while computing devices 130 may each implement a worker node (e.g., as part of the container orchestration engine).

In some embodiments, a container orchestration engine 214 (referred to herein as container host 214), such as the Redhat™ OpenShift™ module, may execute on the host OS 210 of computing device 110 and the host OS 211 of computing device 130, as discussed in further detail herein. The container host module 214 may be a platform for developing and running containerized applications and may allow applications and the data centers that support them to expand from just a few machines and applications to thousands of machines that serve millions of clients. Container host 214 may provide an image-based deployment module for creating containers and may store one or more image files for creating container instances. Many application instances can be running in containers on a single host without visibility into each other's processes, files, network, and so on. Each container may provide a single function (often called a "micro-service") or component of an application, such as a web server or a database, though containers can be used for arbitrary workloads. In this way, the container host 214 provides a function-based architecture of smaller, decoupled units that work together.

Container host 214 may include a storage driver (not shown), such as OverlayFS, to manage the contents of an image file including the read only and writable layers of the image file. The storage driver may be a type of union file system which allows a developer to overlay one file system on top of another. Changes may be recorded in the upper file system, while the lower file system (base image) remains unmodified. In this way, multiple containers may share a file-system image where the base image is read-only media.

An image file may be stored by the container host 214 or a registry server. In some embodiments, the image file may include one or more base layers. An image file may be shared by multiple containers. When the container host 214 creates a new container, it may add a new writable (e.g., in-memory) layer on top of the underlying base layers. However, the underlying image file remains unchanged. Base layers may define the runtime environment as well as the packages and utilities necessary for a containerized application to run. Thus, the base layers of an image file may each comprise static snapshots of the container's configuration and may be read-only layers that are never modified. Any changes (e.g., data to be written by the application running on the container) may be implemented in subsequent (upper) layers such as in-memory layer. Changes made in the in-memory layer may be saved by creating a new layered image.

While the container image is the basic unit containers may be deployed from, the basic units that the container host 214 may work with are called pods. A pod may refer to one or more containers deployed together on a single host, and the smallest compute unit that can be defined, deployed, and managed. Each pod is allocated its own internal IP address, and therefore may own its entire port space. Containers within pods may share their local storage and networking. In some embodiments, pods have a lifecycle in which they are defined, they are assigned to run on a node, and they run until their container(s) exit or they are removed based on their policy and exit code. Although a pod may contain more than one container, the pod is the single unit that a user may deploy, scale, and manage. The control plane 215 of the container host 214 may include replication controllers (not shown) that indicate how many pod replicas are required to run at a time and may be used to automatically scale an application to adapt to its current demand.

By their nature, containerized applications are separated from the operating systems where they run and, by extension, their users. The control plane 215 may expose applications to internal and external networks by defining network policies that control communication with containerized applications (e.g., incoming HTTP or HTTPS requests for services inside the cluster 131).

A typical deployment of the container host 214 may include a control plane 215 and a cluster of worker nodes 131, including worker nodes 131A and 131B (also referred to as compute machines). The control plane 215 may include REST APIs which expose objects as well as controllers which read those APIs, apply changes to objects, and report status or write back to objects. The control plane 215 manages workloads on the worker nodes 131 and also executes services that are required to control the worker nodes 131. For example, the control plane 215 may run an API server that validates and configures the data for pods, services, and replication controllers as well as provides a focal point for the cluster 131's shared state. The control plane 215 may also manage the logical aspects of networking and virtual networks. The control plane 215 may further provide a clustered key-value store (not shown) that stores the cluster 131's shared state. The control plane 215 may also monitor the clustered key-value store for changes to objects such as replication, namespace, and service account controller objects, and then enforce the specified state.

The cluster of worker nodes 131 are where the actual workloads requested by users run and are managed. The worker nodes 131 advertise their capacity and a scheduler (not shown), which is part of the control plane 215, determines which worker nodes 131 containers and pods will be started on. Each worker node 131 includes functionality to accept and fulfill requests for running and stopping container workloads, and a service proxy, which manages communication for pods across worker nodes 131. A worker node 131 may be implemented as a virtual server, logical container, or GPU, for example.

Figure 2:
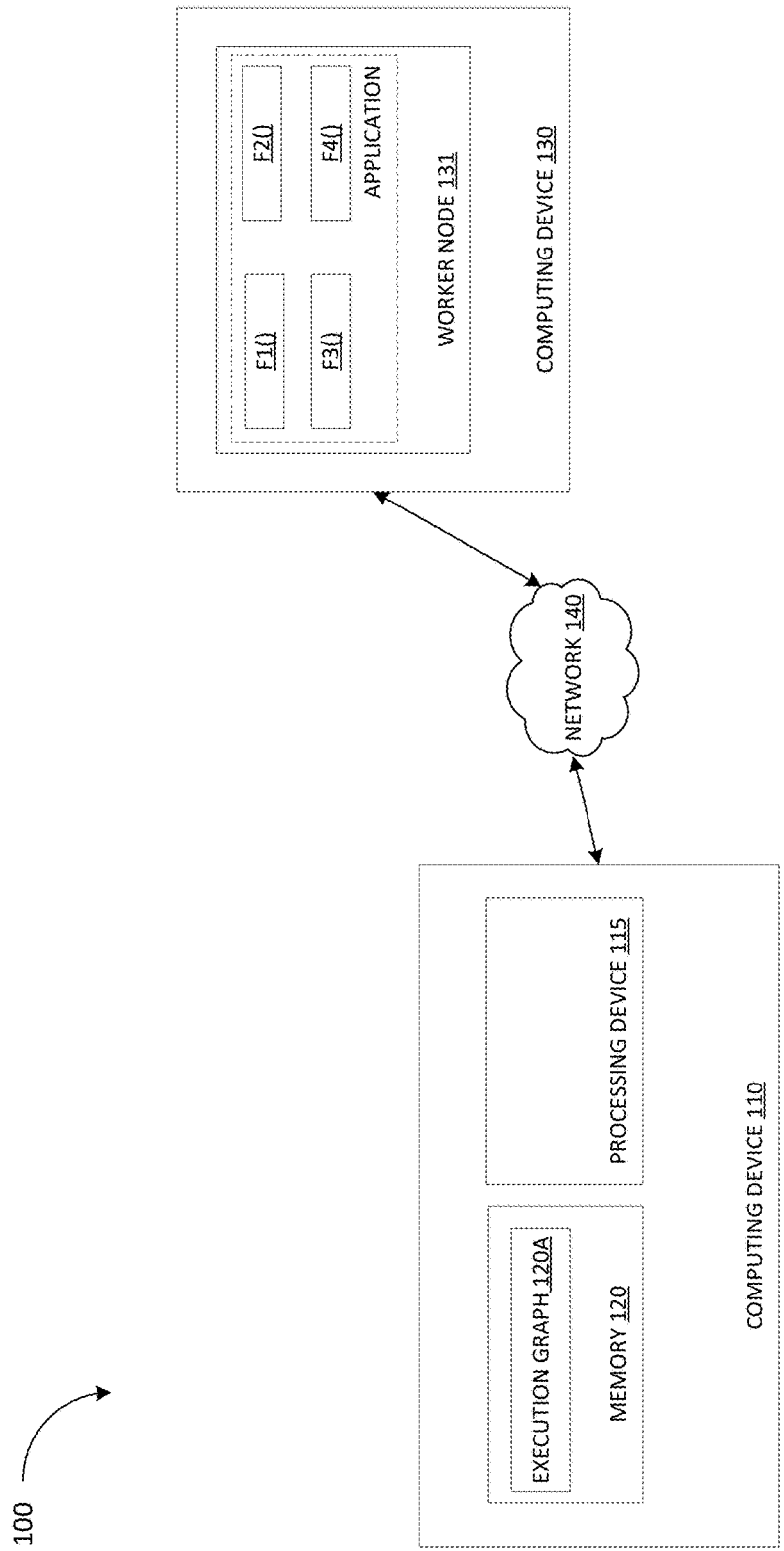
FIG. 2 is a block diagram that illustrates an example FaaS system, in accordance with some embodiments of the present disclosure.

Referring to FIG. 2 as well, since all the software dependencies for an application are resolved within the container itself, a generic operating system may be used on each worker node 131, instead of configuring a specific operating system for each application host. The container host 214 may allow applications to be built as a set of functions, rather than large, monolithic applications. The functions (e.g., f1( )-f4( ) illustrated in FIG. 2) running in the cluster can be scaled individually to meet demand. In this way, a user may scale only the required services instead of the entire application, which can allow the user to meet application demands while using minimal resources. For example, if an application includes three functions, and one of them is ten times more likely to hang or otherwise display unpredictable behavior, or if that function can crash and bring down the server, this would affect the other two functions. In addition, scaling out this function would likewise require scaling out the entire environment including the other two functions that may not have as many load or resource requirements.

Figure 3A:
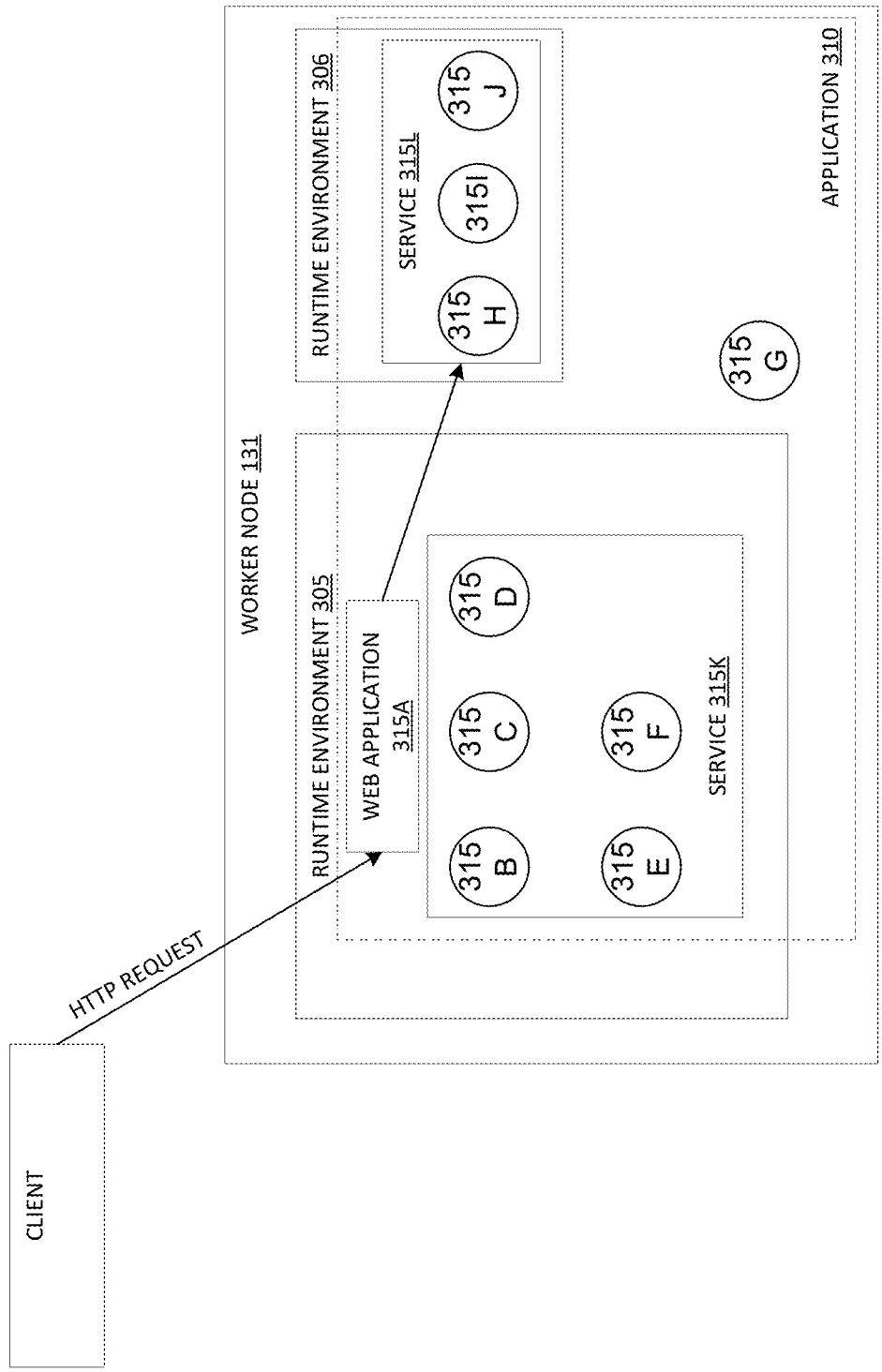
FIG. 3A is a block diagram illustrating the decomposition of an application into multiple functions, in accordance with some embodiments of the present disclosure.

FIG. 3A illustrates an application 310 that has been partially decomposed based on characteristics of some of its components. The application 310 may comprise a web application 315A, a service 315K which includes functions 315B-G, and service 315L which includes functions 315H-J.

The runtime environments 305 and 306 (hereinafter "runtime") may each provide a runtime and deployment environment and may each run on a separate container (not shown). A runtime may be code that enables execution of a function(s). For example, the runtime may provide HTTP server functionality, so that an HTTP call can be made (e.g., by the control plane 215) to the runtime, which translates the HTTP call into a function call, passes the function call to a function for execution, translates the result of the executed function call back to HTTP, and sends it back to the control plane 215. The runtime may also include a number of infrastructure components to robustly handle interprocess communications (e.g., between functions 315) while avoiding cascading failures. FIG. 3A shows how service 315L may be implemented on a separate runtime 306 if it is unstable or requires more resources, or if it is best maintained and upgraded as a small and separate unit. Note that service 315L is still called via the web application 315A, although it is now a remote call, which adds to the network latency of application 310. Similarly, function 315G may be implemented on its own container/runtime (instead of being integrated with service 315K) if it is better (e.g., results in greater scale efficiency) for function 315G to scale separately from the other functions of service 315K, for example.

Figure 3B:
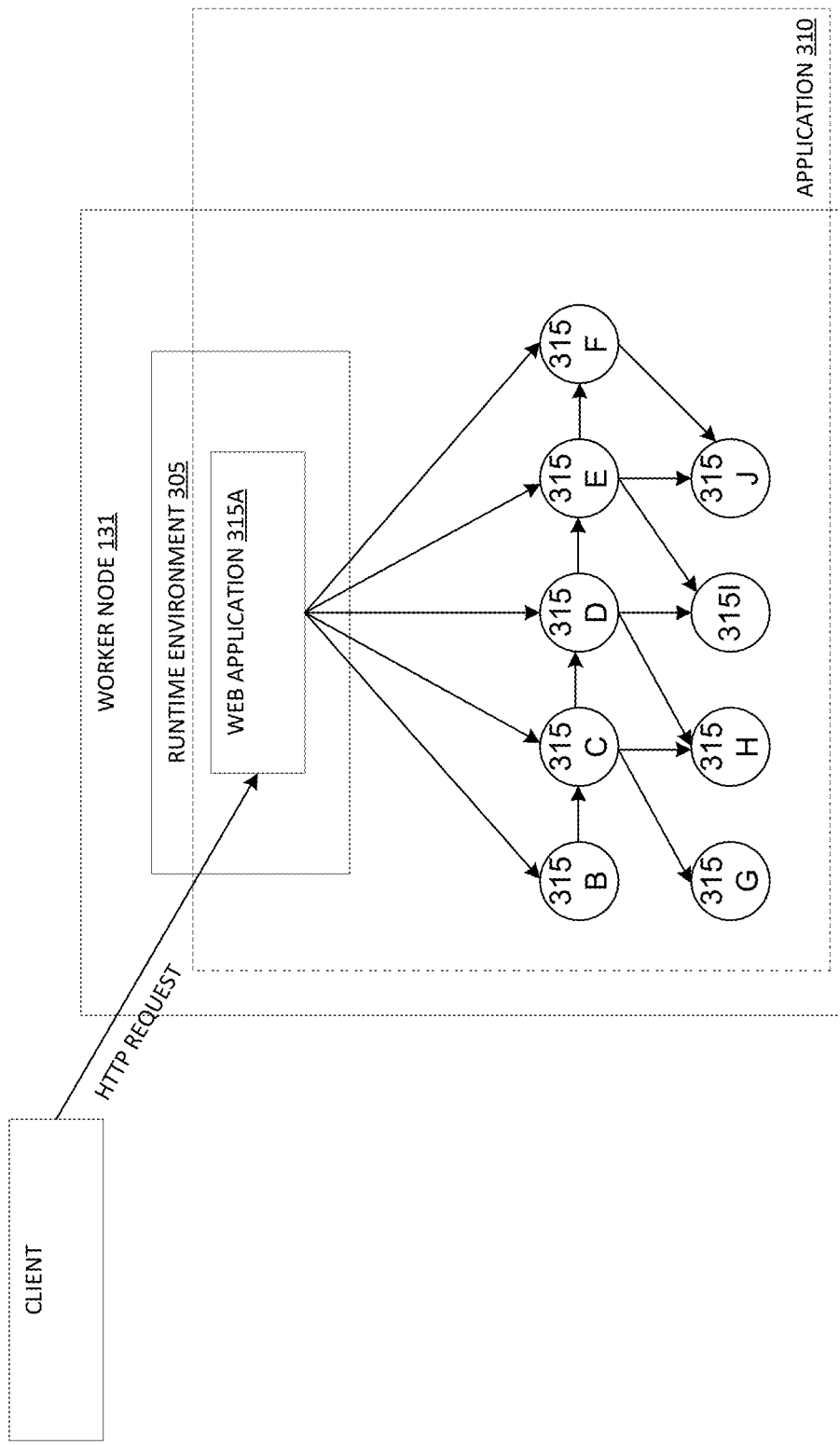
FIG. 3B is a block diagram illustrating the decomposition of an application into multiple functions, in accordance with some embodiments of the present disclosure.

FIG. 3B illustrates the application 310, in an implementation where it has been fully decomposed into the plurality of functions 315B-J. The web application 315A may be used to remotely call to each of the functions 315B-F, which in turn may remotely call to other functions 315 as shown by the arrows in the diagram which originate from a function and point to functions that the function can call to (e.g., point to functions that are dependent on the function). Each of the functions 315B-J may be independently deployed (within its own container and with its own runtime), scaled, upgraded and replaced. The environment illustrated in FIG. 3B is fundamentally heterogeneous, so while frameworks and infrastructure services may be available to provide features and functions, each function is free to use its preferred runtime (e.g., a Java EE server). While the diagram depicts a single web application 310, there may in fact be zero, one, or many applications invoking functions 315B-J.

When an application is decomposed into a large number of functions, each function may depend on a number of other functions. Thus, the resulting execution graph may increase in depth and breadth as well as complexity. Such architectures, while allowing for considerable scalability, introduce a considerable amount of network overhead, as each function call essentially becomes a network roundtrip. Indeed, the network latency that is introduced by the number of hops as an execution graph is traversed can be considerable. Conversely, when an application is decomposed into a small number of functions, scale efficiency becomes an issue. Scale efficiency may refer to the ability to scale a function using the least amount of resources. When an application is decomposed into a small number of functions, it is more difficult to scale individual functions (e.g., only the functions that a user needs) without scaling the entire application, or large parts of the application (e.g., numerous other functions that the individual function is compiled into a composition with), which requires more resources. In the example of FIG. 3A, function 315E cannot scale without the entire service 315K being scaled. Embodiments of the present disclosure provide an intelligent method for analyzing an execution graph and making decisions with respect to compiling monoglot functions into compositions. As used herein, monoglot functions may refer to functions that are defined using the same language (e.g., Java).

Figure 4A:
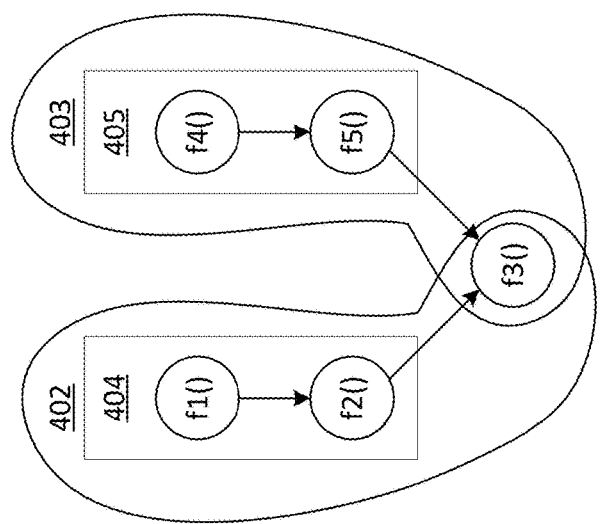
FIG. 4A is a block diagram of an execution graph of functions in an application, in accordance with some embodiments of the present disclosure.

FIG. 4A illustrates an execution graph 400 of a plurality of functions f1( )-f5( ) that an application has been decomposed into. Computing device 110 may analyze the execution graph 400 and may identify one or more portions of the graph that each include two or more of the plurality of functions that are used as a combined entity and have a single entry point. More specifically, computing device 110 may initially attempt to identify one or more sequences of functions among the plurality of functions. A sequence of functions may refer to two or more functions that form a dependency chain (i.e. are sequentially dependent). For example, the graph 400 includes five functions f1( )-f5( ). Functions f1( ), f2( ), and f3( ) form a first sequence 402 because the output from f1( ) is provided as an input to f2( ) (i.e. f2( ) depends on f1( ) so they are sequentially dependent) and the output from f2( ) is provided as an input to f3( ) (i.e. f3( ) depends on f2( ) so f1( )-f3( ) are all sequentially dependent or, stated differently, form a sequence). Because f1( )-f3( ) are sequentially dependent, they may also be said to be used together as a single entity. Similarly, functions f4( ), f5( ), and f3( ) form a second sequence 403. In some embodiments, computing device 110 may initially attempt to identify sequences having the largest number of sequentially dependent functions (e.g., upon identifying f1( )-f2( ) as a sequence, computing device 110 may determine whether there are functions that can further extend the sequence such as f3( ) until it can be extended no more).

For each identified sequence, computing device 110 may attempt to determine groups of functions that form dependency chains without any of the functions being reused by another sequence (i.e. a function thereof) and automatically compile the functions of such groups into a composition. A group of functions that forms a dependency chain without any functions in the group being reused by another sequence may be said to have a single entry point. Therefore, groups of functions that form dependency chains without any of the functions therein being reused by another sequence may correspond to portions of the graph that each include two or more of the plurality of functions that are used as a combined entity and have a single entry point. Computing device 110 may attempt to identify these groups in each sequence in the graph 400. In some embodiments, an entire sequence may be compiled into a composition if all of its functions form a dependency chain and none of them are reused by other sequences. A function may be reused by another sequence if it is dependent on a function from that sequence.

As can be seen in execution graph 400, function f3( ) is dependent on the output from both f2( ) (from sequence 402) and f5( ) (from sequence 403) and is thus reused by functions from different sequences. Stated differently, both sequence 402 and 403 include a function (f3( )) that is reused by a function outside the sequence and thus neither is automatically compiled into a composition. However, since f1( ) and f2( ) form a group of functions where none of the functions are reused by other sequences, computing device 110 may determine that f1( ) and f2( ) should be compiled into a composition 404. Computing device 110 may make a similar determination with respect to f4( ) and f5( ) (composition 405).

Next, computing device 110 may determine whether any of the functions that are reused by different sequences should be compiled into compositions with each function (or composition including the function) that they depend on (e.g., should f3( ) be compiled into both composition 404 and composition 405?). Stated differently, for each portion of the graph that includes two or more of the plurality of functions that are used as a combined entity and has multiple entry points, computing device 110 determines whether any of the functions that provide subsequent entry points (functions that are reused by other sequences) should be compiled.

Figure 4B:
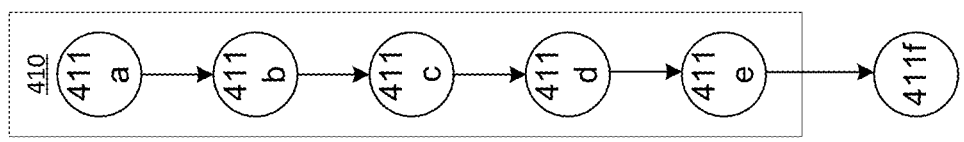
FIG. 4B is a block diagram of an execution graph of functions in an application, in accordance with some embodiments of the present disclosure.
Figure 4B:
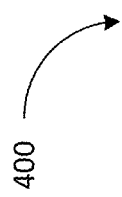

In some embodiments, computing device 110 may determine the benefit to the network latency of the application and the detriment to scale efficiency of the application and determine whether f3( ) should be compiled based on the benefit to network latency relative to the detriment to scale efficiency. FIG. 4B illustrates a composition 410 with a large number of functions 411a-e compiled into it, and function 411f which is deployed separately. Because composition 410 already has numerous functions compiled within it, computing device 110 may determine that compiling an additional function into composition 410 will not significantly impact the scale efficiency of the application. Indeed, scaling any of the functions 411a-e in composition 410 would require scaling the entire composition 410. Thus, in determining whether to compile function 411f into the composition 410, computing device 110 may determine that the network latency introduced by having 411f as a separate service is large, compared to the relatively small decrease in scale efficiency that would result from leaving it separately. Therefore, the computing device 110 may determine that 411f should be compiled into composition 410.

Figure 4C:
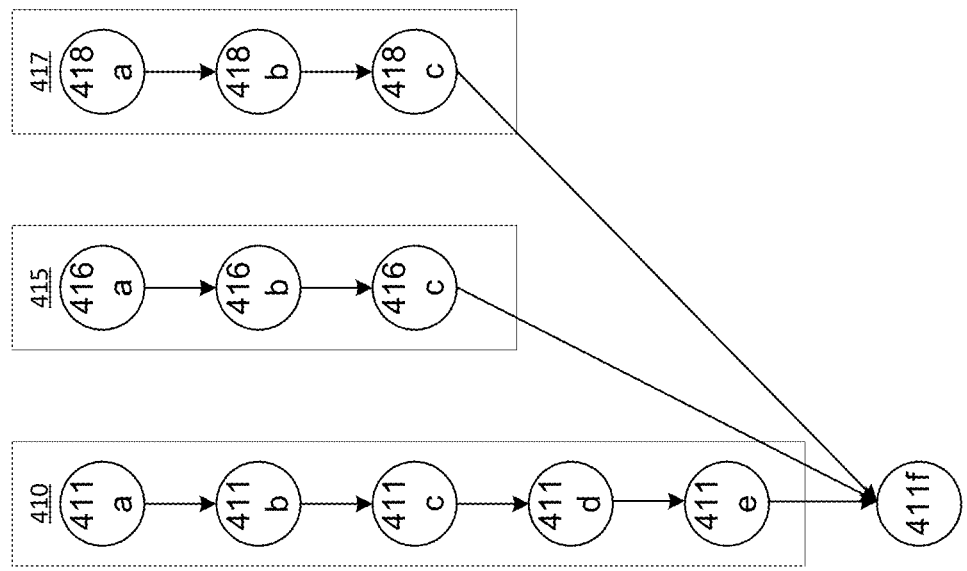
FIG. 4C is a block diagram of an execution graph of functions in an application, in accordance with some embodiments of the present disclosure.

However, the tradeoff between network latency and scale efficiency may also depend on how many functions 411f is reused by. In the example of FIG. 4C, 411f is reused by functions in compositions 415 and 417 as well as composition 410. Because compiling 411f into compositions 410, 415, and 417 would significantly reduce the scale efficiency of the application, computing device 110 may determine that the decrease in (i.e. benefit to) network latency resulting from compiling 411f into compositions 410, 415, and 417 does not justify the decrease in scale efficiency. Therefore, in this example computing device 110 may determine not to compile 411f into compositions 410, 415, and 417.

Referring back to FIG. 4A, in some embodiments, a user may provide an input indicating that network latency or scale efficiency should be prioritized. If computing device 110 places a higher emphasis on scale efficiency based on such user input, since f3( ) is reused by both f2( ) and f5( ), computing device 110 may determine that it should be excluded from compilation and allowed to scale independently of the functions it depends on, as scaling f3( ) after compilation would require scaling composition 404 (f2( ) and f2( )) or composition 405 (f4( ) and f5( )), depending on which instance of f3( ) was being scaled. In this way, although the network latency of the application may increase owing to the additional function calls that must be made to f3( ) the scale efficiency of the application may be preserved as only the resources required to scale f3( ) are required.

In other embodiments where computing device 110 places a higher emphasis on network latency and throughput based on user input, upon determining that f3( ) is reused by f2( ) and f5( ), computing device 110 may determine that f3( ) should be compiled into composition 404 (with f1( ) and f2( ) and composition 405 (with f4( ) and f5( ) respectively. In this way, a composition 407 including f1( )-f3( ) may be formed, and a composition 408 including f3( )-f5( ) may be formed. Network latency and throughput may be preserved in this manner because f2( ) and f5( ) do not need to initiate a separate function call to f3( ) upon executing, and instead, a single function call to compositions 407 and 408 will suffice.

In still other embodiments, computing device 110 may take into account minimum thresholds for network latency or scale efficiency. For example, a user may have defined minimum thresholds for network latency and scale efficiency, which must be maintained. Therefore, although the compilation of a function that is reused may significantly improve network latency while insignificantly decreasing scale efficiency, if the scale efficiency of the application is already at a minimum threshold (i.e. cannot be lowered any further), then computing device 110 may determine that the function should not be compiled.

Computing device 110 may also take into account other factors (in any manner described above) such as stability of the functions, in determining whether to compile functions. Stability of a function may refer to the tendency (or probability) of the function to hang, or otherwise display unpredictable behavior, or tendency to crash, thereby bringing down the server. If such a tendency is high in a function, then computing device 110 may factor this into the determination as an indication that it should scale independently.

Figure 5:
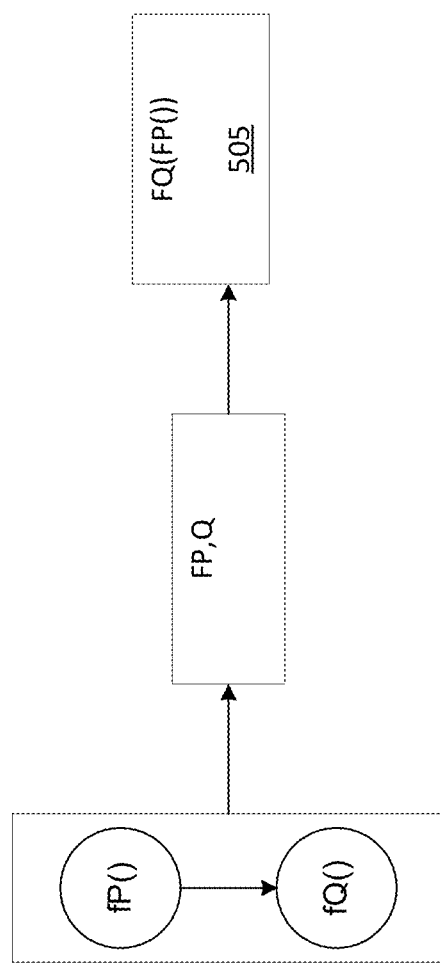
FIG. 5 is a block diagram illustrating the compilation of two functions into a composition, in accordance with some embodiments of the present disclosure.

When compiling a function with another function to generate a composition (or compiling the function into an existing composition, compiling an existing composition into a function, or compiling two compositions together to form a new composition), the computing device 110 may combine the code for both functions into a single run time. Normally, the runtime of each container may provide e.g., HTTP server functionality, so the control plane 215 may make an HTTP call to the runtime, which translates the HTTP call into a function call, sends the function call to the function, takes the result of the function call (executed by the function running thereon) and translates it back to HTTP, and sends it back to the control plane 215. FIG. 5 illustrates the compilation of two functions fP( ) and fQ( ) into a composition. When compiling a function fP( ) with another function fQ( ) computing device 110 may combine the code for both fP( ) and fQ( ), and place the combined code into a single run-time 505 (e.g., a Java run-time). More specifically, computing device 110 may generate a function fP,Q, which calls fP( ) and fQ( ) in sequence, i.e. fQ(fP( )). Computing device 110 hands this function fP,Q to the run-time 505. The run-time 505 may not be aware that such a combination is happening. When an HTTP call for fP( ) is received, the run-time 505 translates the HTTP call into a function call to fP( ), which executes the function call and obtains a result P. Instead of sending the result P back to the run-time 505 however, fP( ) may then issue a function call to fQ( ) with the result P as an argument (e.g., fQ(P)) to obtain a result Q. The run-time 505 may convert the result Q into an HTTP response and send it to the control plane 215. As discussed above, computing device 110 may utilize this process regardless of whether it is generating a composition by compiling a function with another function, compiling a function into an existing composition, compiling an existing composition into a function, or compiling two compositions together to form a new composition.

Figure 6:
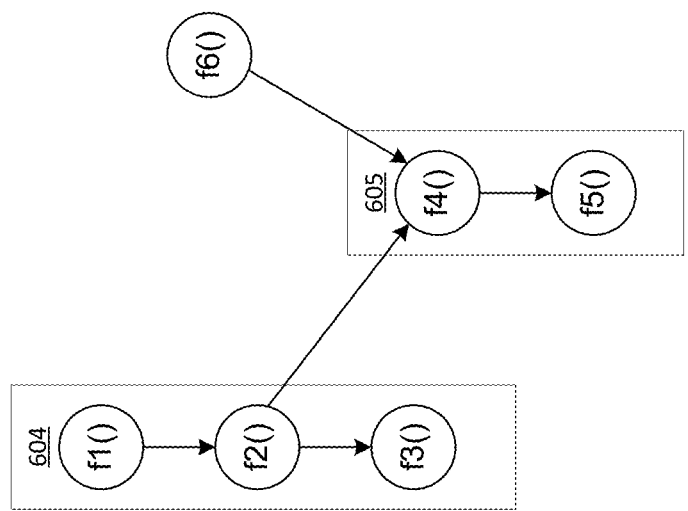
FIG. 6 is a block diagram of an execution graph of functions in an application, in accordance with some embodiments of the present disclosure.

FIG. 6 illustrates an execution graph 600 of functions within an application. As can be seen, the application is comprised of six functions f1( )-f6( ). As discussed above, computing device 110 may analyze the execution graph 600 and may identify one or more portions of the graph that each include two or more of the plurality of functions that are used as a combined entity and have a single entry point. More specifically, computing device 110 may analyze the execution graph 600 and may initially attempt to identify one or more sequences of functions among the plurality of functions. A sequence of functions may refer to two or more functions that form a dependency chain (i.e. are sequentially dependent). Functions f1( ), f2( ), and f3( ) form a first sequence (not shown) because the output from f1( ) is provided as an input to f2( ) (i.e. f2( ) depends on f1( ) so they are sequentially dependent) and the output from f2( ) is provided as an input to f3( ) (i.e. f3( ) depends on f2( ) so f1( )-f3( ) are all sequentially dependent). Because f1( )-f3( ) are sequentially dependent, they may be said to be used together as a single entity. Similarly, functions f4( ), f5( ), and f6( ) form a second sequence (not shown). For each identified sequence, computing device 110 may attempt to determine groups of functions that form the longest dependency chains without having a single function that is reused by another sequence and automatically compile the functions of such sequences into a composition (as discussed with respect to FIG. 5). A group of functions in a sequence that forms a dependency chain without any functions in the group being reused by another sequence may be said to have a single entry point. Therefore, groups of functions that form dependency chains without having a single function that is reused by another sequence may correspond to portions of the graph that each include two or more of the plurality of functions that are used as a combined entity and have a single entry point. Computing device 110 may attempt to identify these groups in each sequence in the graph 600. In some embodiments, an entire sequence may be compiled into a composition if all of its functions form a dependency chain and none of them are reused by other sequences. A function may be reused by another sequence if it is dependent on a function from that sequence.

Computing device 110 may identify the sequence 602 including functions f1( )-f3( ) as a group that is sequentially dependent and where none of the functions in the group are reused by other sequences, and may compile all of the functions f1( )-f3( ) into a composition 604. With respect to functions f4( )-f6( ), although f4( )-f6( ) form a sequence, computing device 110 may determine that f4( ) is being reused by f2( ) (from sequence 602) and f6( ) (from sequence 603). However, f4( ) and f5( ) form a sequentially dependent group where none of the functions are reused by other sequences, and thus computing device 110 may determine that f4( ) and f5( ) should be compiled into a composition 605. Computing device 110 may then determine whether composition 605 should be compiled into a new composition with f6( ) (and a separate new composition with composition 604) based on the factors described above with respect to FIG. 4.

Figure 7:
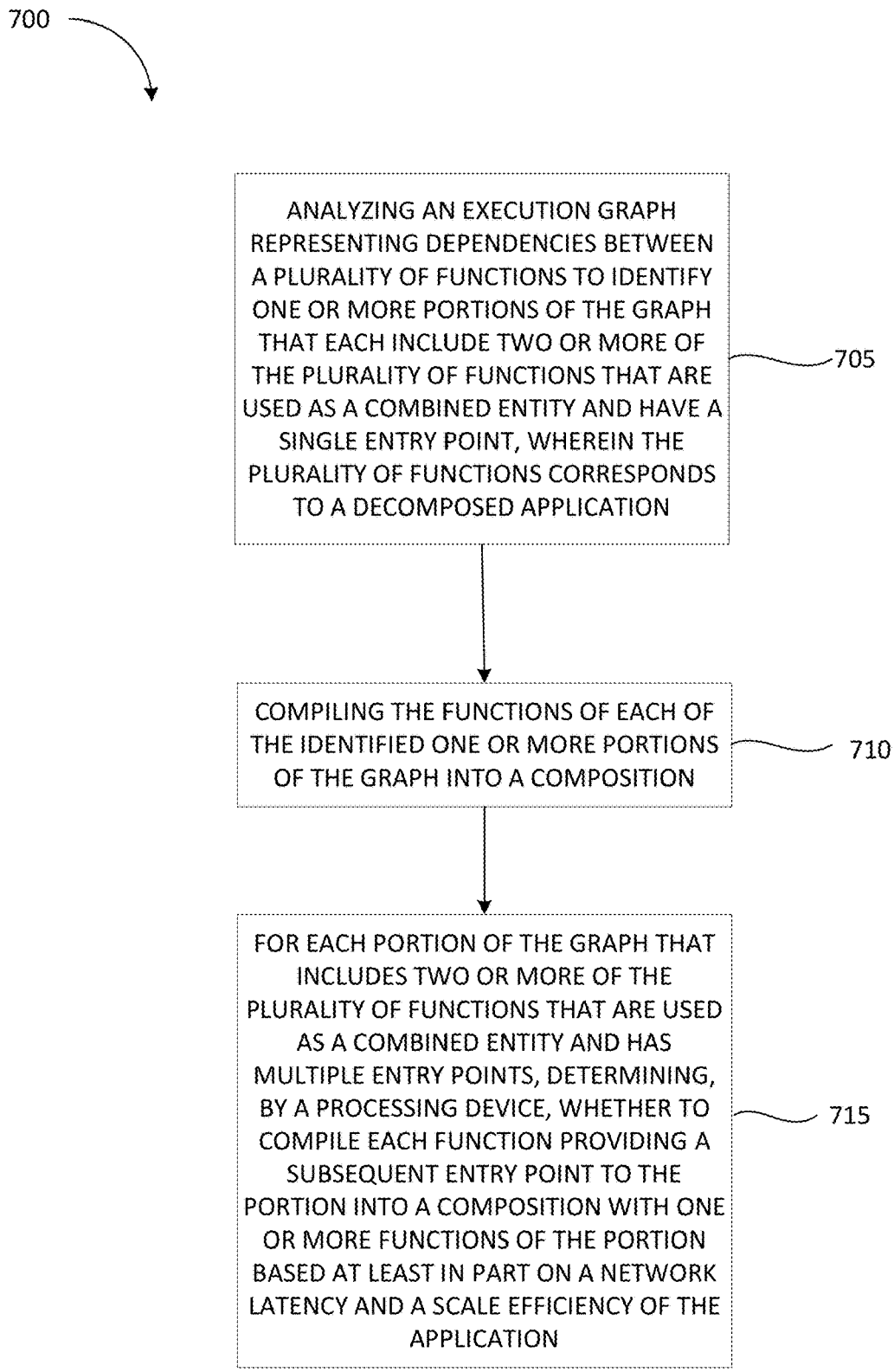
FIG. 7 is a flow diagram of a method for compiling functions together in an FaaS system, in accordance with some embodiments of the present disclosure.

FIG. 7 is a flow diagram of a method 700 of compiling monoglot functions into compositions, in accordance with some embodiments. Method 700 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof in some embodiments, the method 700 may be performed by a computing device (e.g., computing device 110 illustrated in FIGS. 1 and 2).

At block 705, computing device 110 may analyze an execution graph and may identify one or more portions of the graph that each include two or more of the plurality of functions that are used as a combined entity and have a single entry point. More specifically, computing device 110 may initially attempt to identify one or more sequences of functions among the plurality of functions. A sequence of functions may refer to two or more functions that form a dependency chain (i.e. are sequentially dependent). In the example of FIG. 4A, the graph 400 includes five functions f1( )-f5( ). Functions f1( ), f2( ), and f3( ) form a first sequence 402 because the output from f1( ) is provided as an input to f2( ) (i.e. f2( ) depends on f1( ) so they are sequentially dependent) and the output from f2( ) is provided as an input to f3( ) (i.e. f3( ) depends on f2( ) so f1( )-f3( ) are all sequentially dependent). Because f1( )-f3( ) are sequentially dependent, they may also be said to be used together as a single entity. Similarly, functions f4( ), f5( ), and f3( ) form a second sequence 403. For each identified sequence, computing device 110 may attempt to determine groups of functions that form the longest dependency chains without having a single function that is reused by another sequence. A group of functions in a sequence that forms a dependency chain without any functions in the group being reused by another sequence may be said to have a single entry point. Therefore, groups of functions that form dependency chains without any of the functions therein being reused by another sequence may correspond to portions of the graph that each include two or more of the plurality of functions that are used as a combined entity and have a single entry point.

At block 710, computing device 110 may automatically compile the functions of such sequences (portions of the graph) into a composition. At block 715, computing device 110 may determine whether any of the functions that are reused by different sequences should be compiled into compositions with each function (or composition including the function) that they depend on (e.g., should f3( ) be compiled into both composition 404 and composition 405?). In some embodiments, computing device 110 may determine the benefit to network latency of the application and the detriment to scale efficiency of the application and determine whether f3( ) should be compiled based on the benefit to network latency relative to the detriment to scale efficiency.

Figure 8:
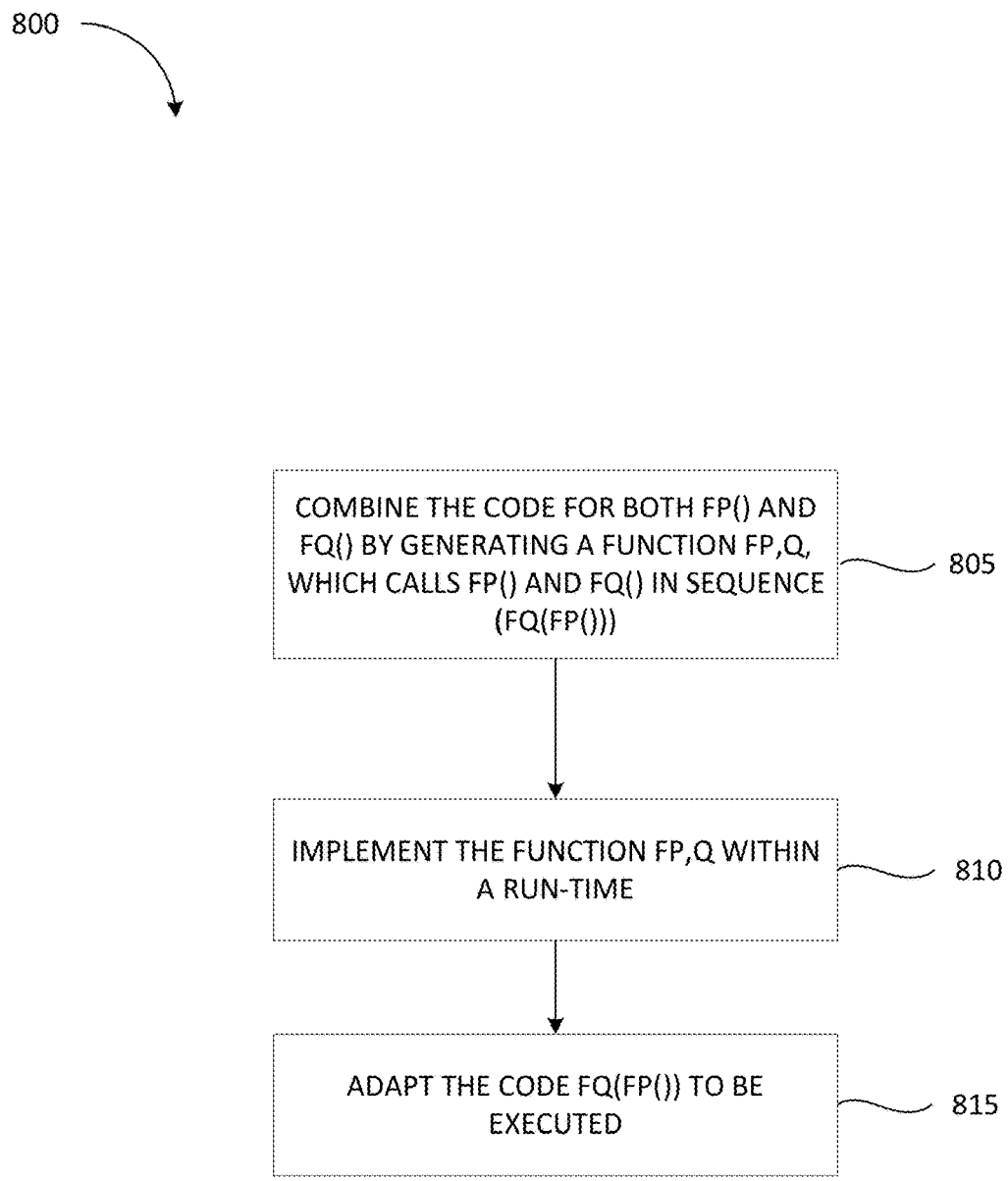
FIG. 8 is a flow diagram of a method for compiling functions into a composition, in accordance with some embodiments of the present disclosure.

FIG. 8 is a flow diagram of a method 800 of combining functions into compositions, in accordance with some embodiments. Method 800 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. in some embodiments, the method 800 may be performed by a computing device (e.g., computing device 110 illustrated in FIGS. 1 and 2).

Referring also to FIG. 5, at block 805, the computing device 110 may combine the code for both fP( ) and fQ( ) More specifically, computing device 110 may generate a function fP,Q, which calls fP( ) and fQ( ) in sequence, i.e. fQ(f( )). At block 810, computing device 110 may place this function fP,Q within a run-time 505 (e.g., a Java run-time). The run-time 505 may not be aware that such a combination is happening. At block 815, when an HTTP call for fP( ) is received (e.g., from the control plane 215), the run-time 505 adapts the code fQ(fP( )) to be executed. To do this, the run-time 505 translates the HTTP call into a function call to fP( ) which executes the function call and obtains a result P. Instead of sending the result P back to the run-time 505 however, fP( ) may then issue a function call to fQ( ) with the result P as an argument (e.g., fQ(P)) to obtain a result Q. The run-time 505 may convert the result Q into an HTTP response and send it to the control plane 215. Computing device 110 may utilize this process regardless of whether it is generating a composition by compiling a function with another function, compiling a function into an existing composition, compiling an existing composition into a function, or compiling two compositions together to form a new composition.

Figure 9:
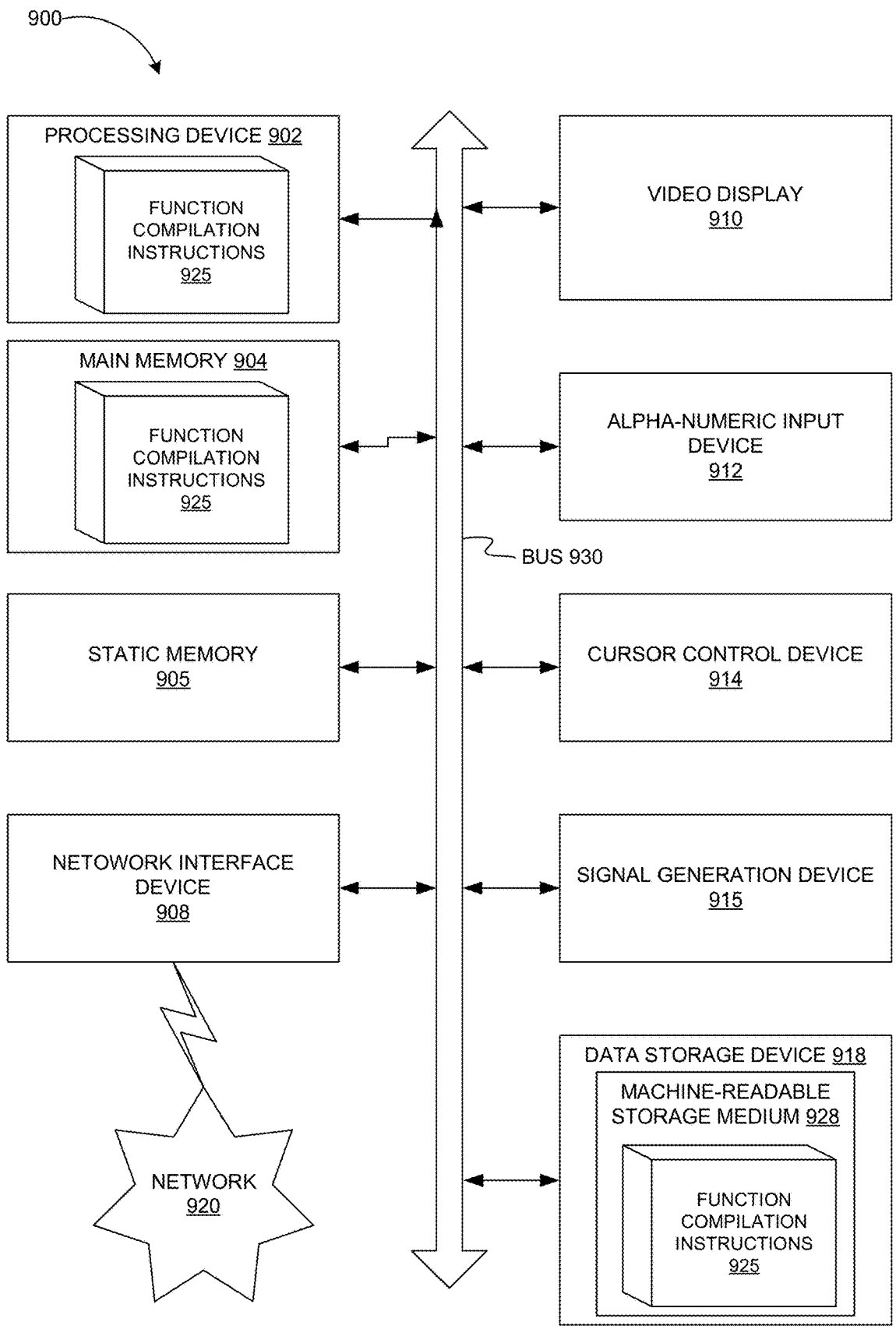
FIG. 9 is a block diagram of an example computing device that may perform one or more of the operations described herein, in accordance with some embodiments of the present disclosure.

FIG. 9 illustrates a diagrammatic representation of a machine in the example form of a computer system 900 within which a set of instructions, for causing the machine to perform any one or more of the methodologies discussed herein for containerizing the packages of an operating system. More specifically, the machine may analyze an execution graph representing dependencies between a plurality of functions that correspond to a decomposed application. The machine may identify one or more portions of the graph that each include two or more of the plurality of functions used as a combined entity and have a single entry point. The functions within such portions of the graph are those that do not need to scale independently (e.g., scale efficiency will not be improved by implementing them separately). Thus, the processing device may compile the functions of each of the identified one or more portions of the graph into a composition. The processing device may then identify each portion of the graph that includes two or more of the plurality of functions used as a combined entity and has multiple entry points. The function(s) in these portions that provides the subsequent entry points are those that depend on functions from outside the portion. The machine may determine whether to compile each function providing a subsequent entry point to the portion into a composition with one or more other functions of the portion based at least in part on the benefit to network latency relative to the decrease in scale efficiency of the application.

In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, a hub, an access point, a network access control device, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 900 may be representative of a server.

The exemplary computer system 900 includes a processing device 902, a main memory 904 (e.g., read-only memory (ROM), flash memory, dynamic random access memory (DRAM), a static memory 906 (e.g., flash memory, static random access memory (SRAM), etc.), and a data storage device 918, which communicate with each other via a bus 930. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Computing device 900 may further include a network interface device 908 which may communicate with a network 920. The computing device 900 also may include a video display unit 910 (e.g., a liquid crystal display (LCD)

or a cathode ray tube (CRT)), an alphanumeric input device 912 (e.g., a keyboard), a cursor control device 914 (e.g., a mouse) and an acoustic signal generation device 916 (e.g., a speaker). In one embodiment, video display unit 910, alphanumeric input device 912, and cursor control device 914 may be combined into a single component or device (e.g., an LCD touch screen).

Processing device 902 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 902 may also be one or more special-purpose processing devices such as an application specific integrated circuit (ASIC), a field programmable gate array (FPGA), a digital signal processor (DSP), network processor, or the like. The processing device 902 is configured to execute function compilation instructions 925, for performing the operations and steps discussed herein.

The data storage device 918 may include a machine-readable storage medium 928, on which is stored one or more sets of function compilation instructions 925 (e.g., software) embodying any one or more of the methodologies of functions described herein. The function compilation instructions 925 may also reside, completely or at least partially, within the main memory 904 or within the processing device 902 during execution thereof by the computer system 900; the main memory 904 and the processing device 902 also constituting machine-readable storage media. The function compilation instructions 925 may further be transmitted or received over a network 920 via the network interface device 908.

The machine-readable storage medium 928 may also be used to store instructions to perform a method for determining functions to compile, as described herein. While the machine-readable storage medium 928 is shown in an exemplary embodiment to be a single medium, the term "machine-readable storage medium" should be taken to include a single medium or multiple media (e.g., a centralized or distributed database, or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

Example 1 is a method comprising: analyzing an execution graph representing dependencies between a plurality of functions to identify one or more portions of the graph that each include two or more of the plurality of functions used as a combined entity and have a single entry point, wherein the plurality of functions corresponds to a decomposed application; compiling the functions of each of the identified one or more portions of the graph into a composition; and for each portion of the graph that includes two or more of the plurality of functions used as a combined entity and has multiple entry points, determining, by a processing device, whether to compile each function providing a subsequent entry point to the portion into a composition with one or more functions of the portion based at least in part on a network latency and a scale efficiency of the application.

Example 2 is the method of example 1, wherein each function providing a subsequent entry point to the portion depends on one or more of the plurality of functions that are outside the portion.

Example 3 is the method of example 2, wherein determining whether to compile a function providing a subsequent entry point to the portion comprises: determining a benefit to network latency and a decrease in scale efficiency of the application resulting from compiling the function into a separate composition with each function that the function depends on; and determining whether to compile the function based on the benefit to network latency relative to the decrease in scale efficiency of the application.

Example 4 is the method of example 3, wherein determining whether to compile the function is further based in part on a user input indicating prioritization of network latency or scale efficiency of the application.

Example 5 is the method of example 3, wherein determining whether to compile the function is further based in part on a stability of the function.

Example 6 is the method of example 1, wherein compiling two or more functions into a composition comprises: combining the code of each of the two or more functions so that they are called sequentially; and including the combined code in a runtime, wherein the runtime is unaware that the two or more functions have been combined.

Example 7 is the method of example 1, wherein each of the plurality of functions is written in the same language.

Example 8 is a system comprising: a memory to store an execution graph representing dependencies between a plurality of functions, wherein the plurality of functions corresponds to a decomposed application; and a processing device operatively coupled to the memory, the processing device to: analyze the execution graph to identify one or more sequences, each of the one or more sequences comprising two or more of the plurality of functions that form a dependency chain; and for each of the identified one or more sequences: compile each group of functions that is sequentially dependent and has no functions that are reused by other sequences, into a composition; and for each function that is reused by other sequences, determine whether to compile the function into a composition with one or more functions of the sequence based at least in part on a network latency and a scale efficiency of the application.

Example 9 is the system of example 8, wherein the one or more functions of the sequence comprise an existing composition.

Example 10 is the system of example 8, wherein to determine whether to compile a function that is reused, the processing device is to: determine a benefit to network latency and a decrease in scale efficiency of the application resulting from compiling the function that is reused into a separate composition in each sequence that the function is reused by; and determine whether to compile the function that is reused based at least in part on the benefit to network latency relative to the decrease in scale efficiency of the application.

Example 11 is the system of example 10, wherein the processing device determines whether to compile the function that is reused based further in part on a user input indicating prioritization of network latency or scale efficiency of the application.

Example 12 is the system of example 10, wherein the processing device determines whether to compile the function that is reused based further in part on a stability of the function.

Example 13 is the system of example 8, wherein to compile two or more functions into a composition, the processing device is to: combine the code of each of the two or more functions so that they are called sequentially; and include the combined code in a runtime, wherein the runtime is unaware that the two or more functions have been combined.

Example 14 is the system of example 8, wherein the plurality of functions are all written in the same language.

Example 15 is a non-transitory computer readable storage medium, having instructions stored thereon which, when executed by a processing device, cause the processing device to: analyze an execution graph representing dependencies between a plurality of functions to identify one or more sequences, each of the one or more sequences comprising two or more of the plurality of functions that form a dependency chain, wherein the plurality of functions corresponds to a decomposed application; and for each of the identified one or more sequences: compile each group of functions that is sequentially dependent and has no functions that are reused by other sequences, into a composition; and for each function that is reused by other sequences, determine, by a processing device, whether to compile the function into a composition with one or more functions of the sequence based at least in part on a network latency and a scale efficiency of the application.

Example 16 is the non-transitory computer readable storage medium of example 15, wherein the one or more functions of the sequence comprise an existing composition.

Example 17 is the non-transitory computer readable storage medium of example 15, wherein to determine whether to compile a function that is reused, the processing device is to: determine a benefit to network latency and a decrease in scale efficiency of the application resulting from compiling the function that is reused into a separate composition in each sequence that the function is reused by; and determine whether to compile the function that is reused based at least in part on the benefit to network latency relative to the decrease in scale efficiency of the application.

Example 18 is the non-transitory computer readable storage medium of example 17, wherein the processing device determines whether to compile the function that is reused based further in part on a user input indicating prioritization of network latency or scale efficiency of the application.

Example 19 is the non-transitory computer readable storage medium of example 17, wherein the processing device determines whether to compile the function that is reused based further in part on a stability of the function.

Example 20 is the non-transitory computer readable storage medium of example 15, wherein to compile two or more functions into a composition, the processing device is to: combine the code of each of the two or more functions so that they are called sequentially; and include the combined code in a runtime, wherein the runtime is unaware that the two or more functions have been combined.

Example 21 is the non-transitory computer readable storage medium of example 15, wherein the plurality of functions are all written in the same language Example 22 is a system comprising: a memory to store an execution graph representing dependencies between a plurality of functions, wherein the plurality of functions corresponds to a decomposed application; and a processing device operatively coupled to the memory, the processing device to: analyze the execution graph to identify one or more portions of the graph that each include two or more of the plurality of functions used as a combined entity and have a single entry point; compile the functions of each of the identified one or more portions of the graph into a composition, and for each portion of the graph that includes two or more of the plurality of functions used as a combined entity and has multiple entry points, determine whether to compile each function providing a subsequent entry point to the portion into a composition with one or more functions of the portion based at least in part on a network latency and a scale efficiency of the application.

Example 23 is the system of example 22, wherein each function providing a subsequent entry point to the portion depends on one or more of the plurality of functions that are outside the portion.

Example 24 is the system of example 23, wherein to determine whether to compile a function providing a subsequent entry point to the portion, the processing device is to: determine a benefit to network latency and a decrease in scale efficiency of the application resulting from compiling the function into a separate composition with each function that the function depends on; and determine whether to compile the function based on the benefit to network latency relative to the decrease in scale efficiency of the application.

Example 25 is the system of example 24, wherein the processing device is to determine whether to compile the function further based in part on a user input indicating prioritization of network latency or scale efficiency of the application.

Example 26 is the system of example 24, wherein the processing device is to determine whether to compile the function further based in part on a stability of the function.

Example 27 is the system of example 22, wherein to compile two or more functions into a composition, the processing device is to: combine the code of each of the two or more functions so that they are called sequentially; and include the combined code in a runtime, wherein the runtime is unaware that the two or more functions have been combined.

Example 28 is the system of example 22, wherein each of the plurality of functions is written in the same language.

Example 29 is a method comprising: analyzing an execution graph representing dependencies between a plurality of functions to identify one or more sequences, each of the one or more sequences comprising two or more of the plurality of functions that form a dependency chain, wherein the plurality of functions corresponds to a decomposed application; and for each of the identified one or more sequences: compiling each group of functions that is sequentially dependent and has no functions that are reused by other sequences, into a composition; and for each function that is reused by other sequences, determining whether to compile the function into a composition with one or more functions of the sequence based at least in part on a network latency and a scale efficiency of the application.

Example 30 is the method of example 29, wherein the one or more functions of the sequence comprise an existing composition.

Example 31 is the method of example 29, wherein determining whether to compile a function that is reused comprises: determining a benefit to network latency and a decrease in scale efficiency of the application resulting from compiling the function that is reused into a separate composition in each sequence that the function is reused by; and determining whether to compile the function that is reused based at least in part on the benefit to network latency relative to the decrease in scale efficiency of the application.

Example 32 is the method of example 31, wherein determining whether to compile the function that is reused is based further in part on a user input indicating prioritization of network latency or scale efficiency of the application.

Example 33 is the method of example 31, wherein determining whether to compile the function that is reused is based further in part on a stability of the function.

Example 34 is the method of example 29, wherein compiling two or more functions into a composition comprises: combining the code of each of the two or more functions so that they are called sequentially; and including the combined code in a runtime, wherein the runtime is unaware that the two or more functions have been combined.

Example 35 is the method of example 29, wherein each of the plurality of functions are written in the same language.

Example 36 is an apparatus comprising: means for analyzing an execution graph representing dependencies between a plurality of functions to identify one or more portions of the graph that each include two or more of the plurality of functions used as a combined entity and have a single entry point, wherein the plurality of functions corresponds to a decomposed application, means for compiling the functions of each of the identified one or more portions of the graph into a composition, and means for, for each portion of the graph that includes two or more of the plurality of functions used as a combined entity and has multiple entry points, determining whether to compile each function providing a subsequent entry point to the portion into a composition with one or more functions of the portion based at least in part on a network latency and a scale efficiency of the application.

Example 37 is the apparatus of example 36, wherein each function providing a subsequent entry point to the portion depends on one or more of the plurality of functions that are outside the portion.

Example 38 is the apparatus of example 37, wherein the means for determining whether to compile a function providing a subsequent entry point to the portion further comprise means for: determining a benefit to network latency and a decrease in scale efficiency of the application resulting from compiling the function into a separate composition with each function that the function depends on; and determining whether to compile the function based on the benefit to network latency relative to the decrease in scale efficiency of the application.

Example 39 is the apparatus of example 36, wherein each of the plurality of functions is written in the same language.

Unless specifically stated otherwise, terms such as "receiving," "routing," "updating," "providing," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method comprising:
analyzing an execution graph representing dependencies between a plurality of functions to identify one or more portions of the execution graph that each include two or more of the plurality of functions used as a combined entity and each having a single entry point, wherein the plurality of functions corresponds to an application that is decomposed;
combining the functions of each of the identified one or more portions of the execution graph into a composition; and
for each portion of the execution graph that includes two or more of the plurality of functions used as the combined entity and has at least one function comprising multiple entry points, determining, by a processing device, whether to combine the at least one function comprising the multiple entry points into the composition based at least in part on a network latency and a scale efficiency of the application, wherein each composition is executed by a single runtime.

2. The method of claim 1, wherein the at least one function comprising the multiple entry points comprises a subsequent entry point to the portion that depends on one or more of the plurality of functions that are outside the portion.

3. The method of claim 2, wherein determining whether to combine a function providing the subsequent entry point to the portion comprises:
determining a benefit to the network latency and a decrease in the scale efficiency of the application resulting from combining the function into a separate composition with each function that the function depends on; and
determining whether to combine the function based on the benefit to the network latency relative to the decrease in the scale efficiency of the application.

4. The method of claim 3, wherein determining whether to combine the function is further based in part on a user input indicating prioritization of the network latency or the scale efficiency of the application.

5. The method of claim 3, wherein determining whether to combine the function is further based in part on a stability of the function.

6. The method of claim 1, wherein combining two or more functions into the composition comprises:
combining code of each of the two or more functions into combined code so that they are called sequentially; and
including the combined code in a runtime, wherein the runtime is unaware that the two or more functions have been combined.

7. The method of claim 1, wherein each of the plurality of functions is written in a same language.

8. A system comprising:
a memory to store an execution graph representing dependencies between a plurality of functions, wherein the plurality of functions corresponds to an application that is decomposed; and
a processing device operatively coupled to the memory, the processing device to:
analyze the execution graph to identify one or more sequences, each of the one or more sequences comprising two or more of the plurality of functions each having a single entry point that form a dependency chain; and
for each of the identified one or more sequences:
combine each group of functions that is sequentially dependent and has no functions that are reused by other sequences, into a composition; and
for each function that is reused by the other sequences, determine whether to combine the function into the composition with one or more functions of the sequence based at least in part on a network latency and a scale efficiency of the application, wherein each composition is executed by a single runtime.

9. The system of claim 8, wherein the one or more functions of the sequence comprise an existing composition.

10. The system of claim 8, wherein to determine whether to combine a function that is reused, the processing device is to:
determine a benefit to the network latency and a decrease in the scale efficiency of the application resulting from combining the function that is reused into a separate composition in each one of the sequences that the function is reused by; and
determine whether to combine the function that is reused based at least in part on the benefit to the network latency relative to the decrease in the scale efficiency of the application.

11. The system of claim 10, wherein the processing device determines whether to combine the function that is reused based further in part on a user input indicating prioritization of the network latency or the scale efficiency of the application.

12. The system of claim 10, wherein the processing device determines whether to combine the function that is reused based further in part on a stability of the function.

13. The system of claim 8, wherein to combine two or more functions into the composition, the processing device is to:
combine code of each of the two or more functions into combined code so that they are called sequentially; and
include the combined code in a runtime, wherein the runtime is unaware that the two or more functions have been combined.

14. The system of claim 8, wherein the plurality of functions are all written in a same language.

15. A non-transitory computer readable medium, having instructions stored thereon which, when executed by a processing device, cause the processing device to:
- analyze an execution graph representing dependencies between a plurality of functions to identify one or more sequences, each of the one or more sequences comprising two or more of the plurality of functions each having a single entry point that form a dependency chain, wherein the plurality of functions corresponds to an application that is decomposed; and
- for each of the identified one or more sequences:
  - combine each group of functions that is sequentially dependent and has no functions that are reused by other sequences, into a composition; and
  - for each function that is reused by the other sequences, determine, by the processing device, whether to combine the function into the composition with one or more functions of the sequence based at least in part on a network latency and a scale efficiency of the application, wherein each composition is executed by a single runtime.

16. The non-transitory computer readable medium of claim 15, wherein the one or more functions of the sequence comprise an existing composition.

17. The non-transitory computer readable medium of claim 15, wherein to determine whether to combine a function that is reused, the processing device is to:
- determine a benefit to the network latency and a decrease in the scale efficiency of the application resulting from combining the function that is reused into a separate composition in each one of the sequences that the function is reused by; and
- determine whether to combine the function that is reused based at least in part on the benefit to the network latency relative to the decrease in the scale efficiency of the application.

18. The non-transitory computer readable medium of claim 17, wherein the processing device determines whether to combine the function that is reused based further in part on a user input indicating prioritization of the network latency or the scale efficiency of the application.

19. The non-transitory computer readable medium of claim 17, wherein the processing device determines whether to combine the function that is reused based further in part on a stability of the function.

20. The non-transitory computer readable medium of claim 15, wherein to combine two or more functions into the composition, the processing device is to:
- combine code of each of the two or more functions into combined code so that they are called sequentially; and
- include the combined code in a runtime, wherein the runtime is unaware that the two or more functions have been combined.

* * * * *